United States Patent [19]
Davis

[11] Patent Number: 4,527,451
[45] Date of Patent: Jul. 9, 1985

[54] STRIPPING TOOL FOR SHIELDED RIBBON CABLE
[75] Inventor: Newton G. Davis, Harrisburg, Pa.
[73] Assignee: AMP Incorporated, Harrisburg, Pa.
[21] Appl. No.: 614,356
[22] Filed: May 29, 1984
[51] Int. Cl.³ .............................................. H02G 1/12
[52] U.S. Cl. ...................................... 81/9.51; 83/924
[58] Field of Search ................. 81/9.51, 9.5 R, 9.5 A; 83/924, 925 R; 30/90.1, 90.4, 90.6; 29/426.1

[56] References Cited
U.S. PATENT DOCUMENTS

| | | | |
|---|---|---|---|
| 3,774,478 | 11/1973 | Carpenter et al. | 81/9.51 |
| 3,832,767 | 9/1974 | Petree | 81/9.51 |
| 4,120,217 | 10/1978 | Rodd et al. | 81/9.51 |
| 4,130,040 | 12/1978 | Donnelly, Sr. et al. | 83/925 R |
| 4,455,745 | 6/1984 | Toeppen | 81/9.51 |

Primary Examiner—Roscoe V. Parker
Attorney, Agent, or Firm—F. Brice Faller

[57] ABSTRACT

Stripping tool for removing a length of outer insulation from the end of shielded ribbon cable comprises means for aligning lateral edges of cable, means for clamping planar surfaces at end of cable, and parallel shear blades which descend to shear the edges of the cable along the length of insulation to be removed, exposing the shield along at least one edge. The shear blades are fixed to a ram which also carries a scoring blade which cooperates with a scoring blade below the cable to form cuts in opposed planar surfaces of insulation. The insulation is stripped by pulling against the scoring blades leaving the shield intact.

11 Claims, 9 Drawing Figures

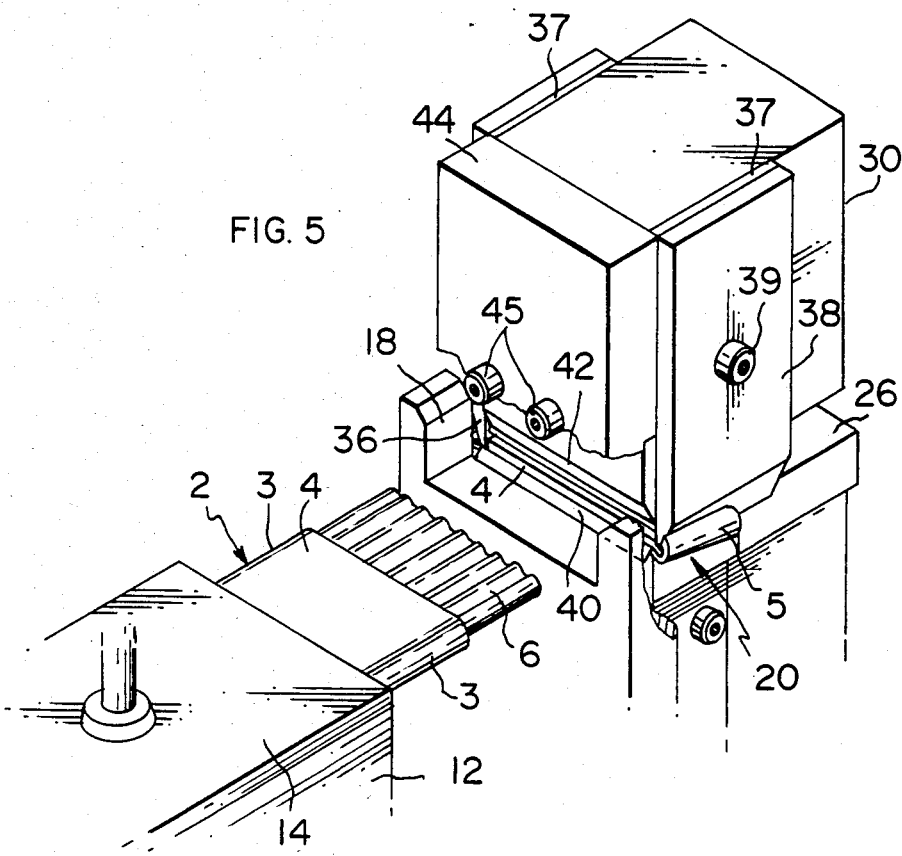
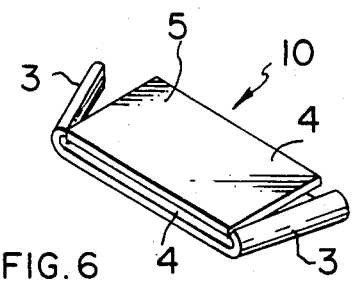

STRIPPING TOOL FOR SHIELDED RIBBON CABLE

BACKGROUND OF THE INVENTION

The present invention relates to apparatus for stripping electrical insulation from the end of a ribbon cable, more particularly to precision apparatus for removing the outer insulation from ribbon cable having a foil shield.

The term ribbon cable is generally applied to a plurality of side-by-side conductors embedded in a common body on insulation. The relatively close control of conductor spacing lends such cable readily to mass termination to insulation displacing terminals having centerlines spaced as the conductors. In recent years data transmission applications have led to the development of shielded cable having a foil shield around the ribbon cable, which shield is in turn surrounded by a common body of outer insulation. Such cable is commonly manufactured by running the ribbon cable and a drain wire through a die which forms the foil shield thereagainst in a "cigarette wrap" configuration, and subsequently through an extrusion die where PVC insulation is extruded against the foil to form the outer insulation. The foil shield is actually a laminate of foil and polyester film, with the polyester film facing outward against the PVC.

U.S. Pat. No. 3,774,478 describes an apparatus for stripping insulation from the end of a ribbon cable. Cutting blades mounted on opposite sides of a cable support are arranged to move on arcuate paths toward opposite planar sides of the cable, the blades having parallel rectilinear edges which penetrate the insulation. The cable is then pulled from the closed blades, leaving a single slug of insulation. While this tool is well suited to stripping ordinary ribbon cable, problems arise when it is used with shielded cable. Play in the linkage which effects arcuate movement of the blades makes it difficult to adjust for effective insulation penetration without nicking the foil shield. Since the insulation is pulled off in a single tubular slug, it is sufficiently adhered to the shield to tear it free if the shield is nicked. Since it is desirable to consistently keep the exposed shield intact with the shield in the unstripped portion of cable for termination purposes, a more specilized tool would be desirable.

SUMMARY OF THE INVENTION

The present invention is directed to removing insulation from the end of a foil shielded cable without damaging the foil. Scoring blades approach the opposite planar sides of the cable directly and penetrate forming cuts. One scoring blade is fixed relative to an anvil and the other is fixed relative to a ram which moves toward the anvil. The elimination of linkage associated with arcuate movement makes depth of insulation penetration easier to control, thereby reducing the possibility of damage to the shield. The elimination of arcuate movement, however, makes cutting less effective, with the attendant result that the slug of insulation would still be difficult to remove without damaging the insulation. This problem is addressed by shearing the outer insulation from the lateral edges of the cable end, which sufficiently relieves the forces on the shield to permit removing the insulation without damaging the shield.

Shearing the outer insulation from the edges of the cable end without nicking the shield is difficult due to the substantial variation in the insulation thickness on these edges. This variation is caused by the tendency of the ribbon cable to wander when it passes through the extrusion die where the outer jacket is applied to the shield. Since the overall width across the cable insulation is relatively closely controlled by the die profile, the wandering causes variation in location of the shield. Thus the shear blades must be located to descend clear of the shield on the edge where insulation is thinnest with the result that the shield in not exposed on the opposite edge in the cross-section. It has been discovered, however, that exposing the shield on only one edge, combined with the effect of substantially weakening the opposite edge and scoring the planar sides, sufficiently relieves the outer insulation on the end to permit removal without damaging the end.

BRIEF DESCRIPTION OF THE DRAWINGS

FIGS. 1 to 5 are perspectives of the apparatus showing the sequence of operations to strip the cable.

FIG. 6 is a perspective of the end piece of insulation.

DETAILED DESCRIPTION OF THE PREFERRED EMBODIMENT

Figure 1:
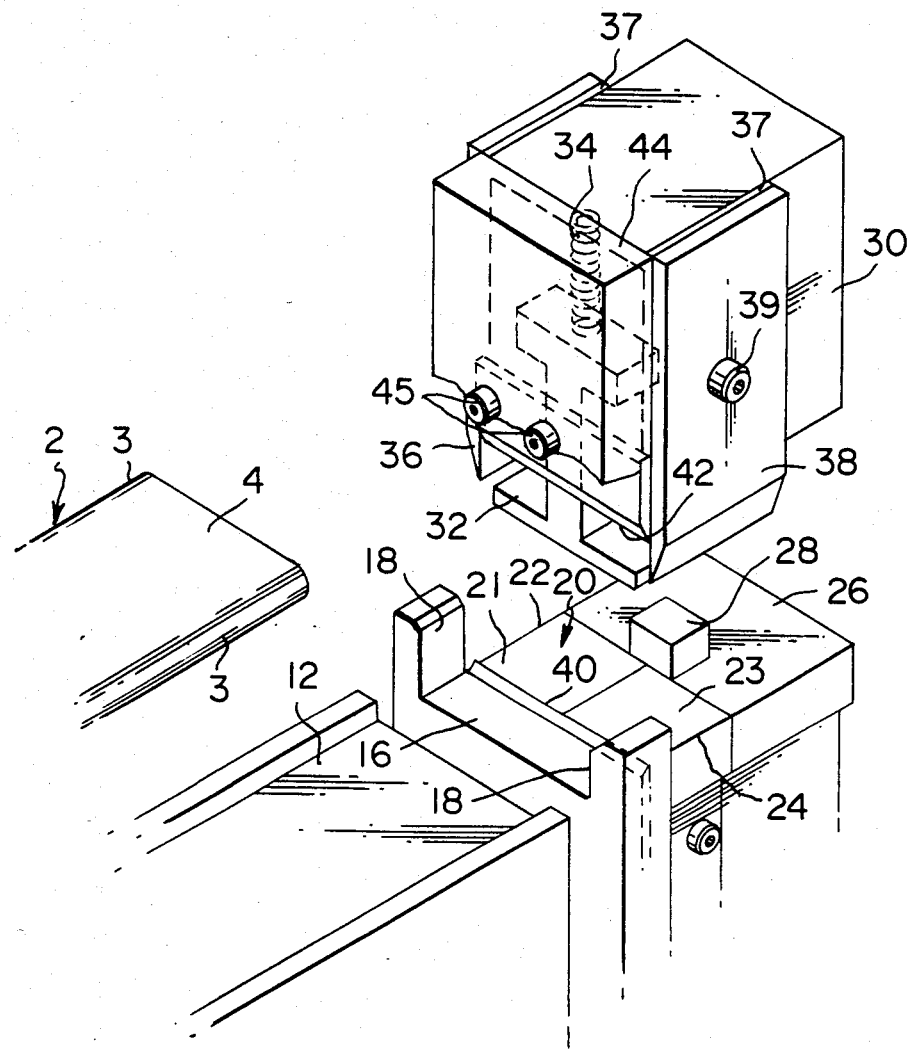

FIG. 1 shows the cable 2 having opposed lateral edges 3 and opposed planar sides 4 poised for reception in first cable guide 12, which is aligned with and spaced from second cable guide 16. The guide 16 has sidewalls 18 which serve to positively position the lateral edges 3 relative to ram 30, which moves only vertically relative to guide 16, anvil 20, and platen 26, which are fixed together. The anvil 20 comprises left and right halves 21, 23 bounded by opposed edges 22, 24 respectively. The bipartite arrangement permits placing shims (not shown) between halves 21, 23 to control the spacing of edges 22, 24, which cooperate with respective shear blades 36, 38 as will be shown. A lower or first scoring blade 40 fixed between the guide 16 and anvil 20 projects only far enough above the surfaces to assure penetration of the cable jacket without nicking the shield, as will be shown.

The ram 30 carries a plate 32 arranged to slide vertically therein; a spring 34 causes the plate 32 to be resiliently loaded against anvil 20 when the ram 30 descends. Shear blades 36, 38 are fixed to lateral sides of ram 30 by screws 39; shims 37 are inserted between the blades 36, 38 and the ram 30 to control spacing to assure proper cooperation with respective edges 22, 24 below. An upper or second scoring blade 42 is fixed to the front of ram 30 by retaining block 44 and screws 45.

Figure 2:
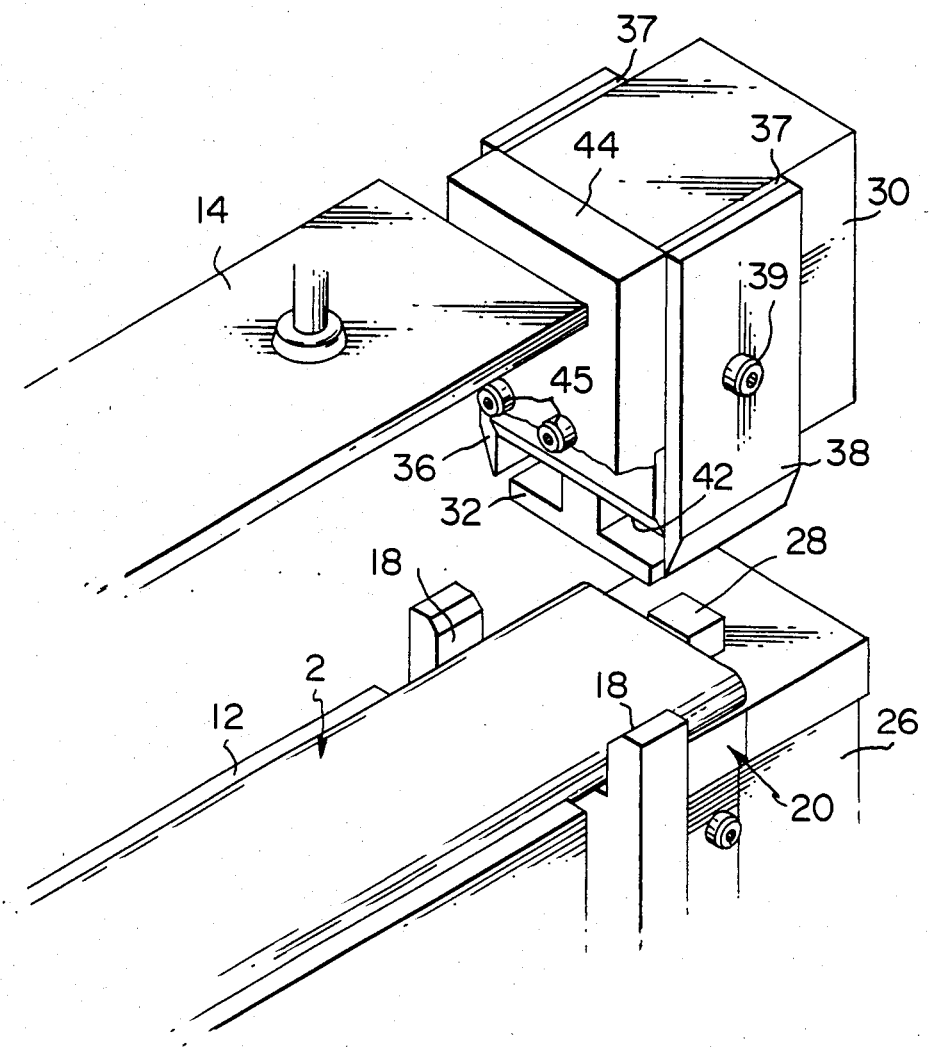

FIG. 2 shows the cable 2 clamped in guide 12 prior to applying clamp 14, which firmly clamps the cable against axial movement after it is positioned between sidewalls 18 and against stop 28. Since the overall width of the cable 2 does not vary substantially, the position of sidewalls 18 may be fixed.

Figure 3:
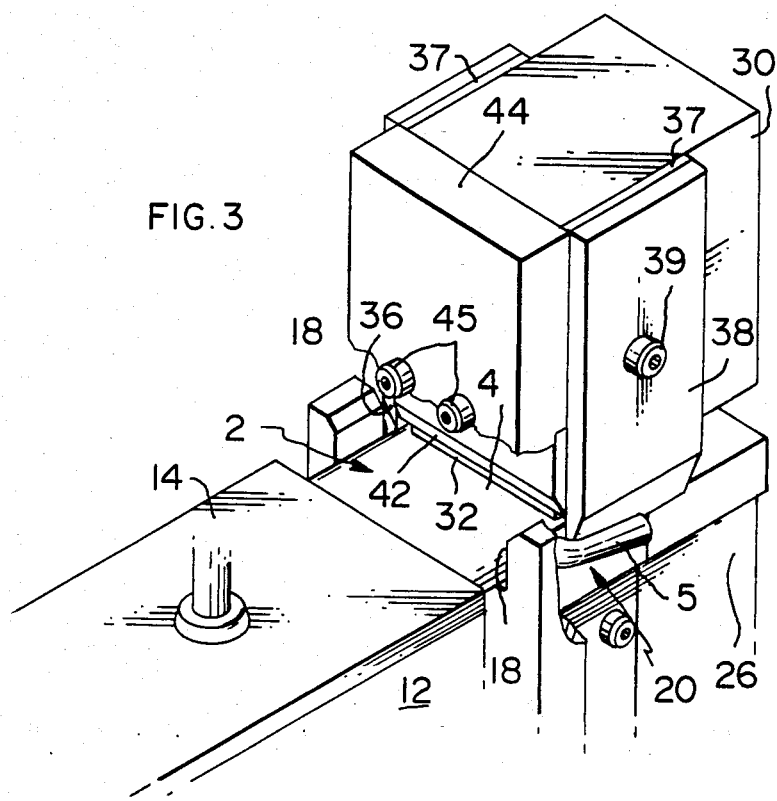

FIG. 3 shows the cable 2 clamped in guide 12 and ram 30 partially descended. The plate 32 bears resiliently against the planar side 4 as shear blades 36, 38 descend to shear the outer insulation 5 from lateral edges 3 toward the end of the cable.

Figure 4:
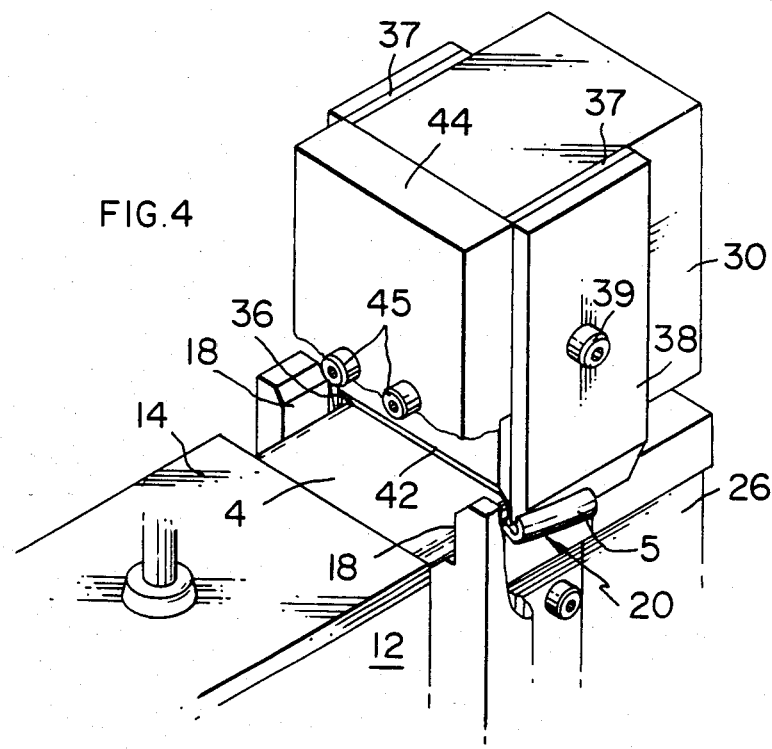

FIG. 4 shows the ram 30 fully descended toward anvil 20 and platen 26. Upper scoring blade 42 has penetrated the outer insulation 5 on planar side 4 forming a cut directly opposite a cut on the opposed planar side 4 formed by lower scoring blade 40 (FIG. 1). The blades 40, 42 hold the severed portion of insulation against axial movement so that moving the guide 12 and clamp 14 as shown in FIG. 5 pulls the cable 2 free of the end of outer insulation 5, exposing the foil shield 6. The ram 30 then retreats, and an end piece 10 of insulation 5 as shown in FIG. 6 is removed. The lateral edges 3 may still be attached to piece 10, as may planar sides 4, but the piece 10 is sufficiently fragmented to allow the shield 6 to be pulled free without incurring damage.

Figure 7:
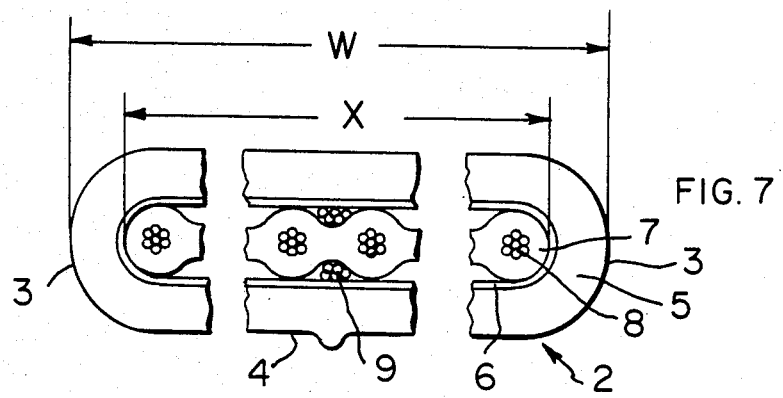
FIG. 7 is an end view of the cable.

FIG. 7 is an end view of the cable 2, clearly showing the conductors 8, inner insulation 7, drain wire 9, shield 6, and outer insulation 5 defining opposed planar sides 4 and lateral edges 3. The dimension W is the overall width of the cable 2, which in one popular data transmission cable is 0.865 inch and varies by only about 0.003 inch due to the fixed profile of the extrusion die. The dimension X is the width of the inner ribbon cable insulation 7 which in the data cable is 0.800±0.007 inch. The shield is of substantially constant 0.002 inch thickness, and the nominal thickness of outer jacket 5 is about 0.030 inch, with a variation of 0.007 inch at the edges. Thus the position of the shield 6 relative to edges 3 can vary considerably.

Figure 8:
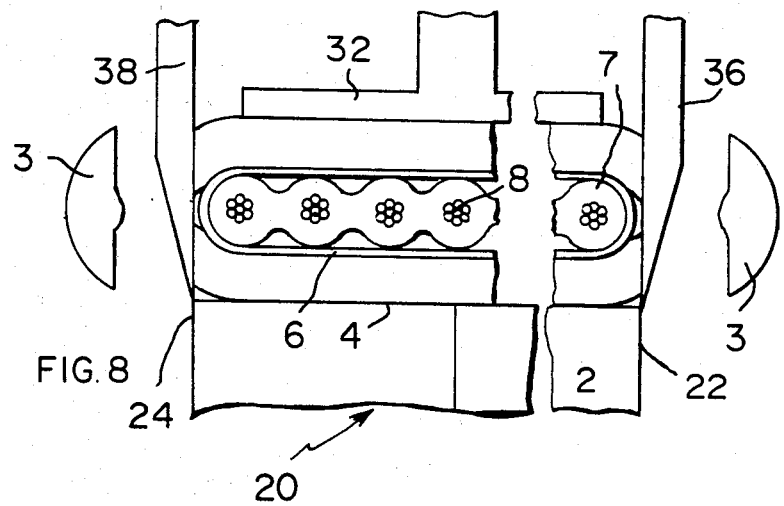
FIG. 8 is an end view of the cable shearing operation with uniform insulation thickness on opposed edges.

FIG. 8 shows the cable 2 held against anvil 20 by resilient plate 32 after the blades 36, 38 have descended to shear lateral cable edges 3 against opposed edges 22, 24 of the anvil 20. Note the space between blades 36, 38 and shield 6; this occurs when the shield 6 is laterally centered in the cable 2. The shield is exposed despite this space because the insulation 5 tears free from the shield 6 when the blades 36, 38 pass this closely. Thus, when the shield 5 is so centered, the blades expose it on both edges.

Figure 9:
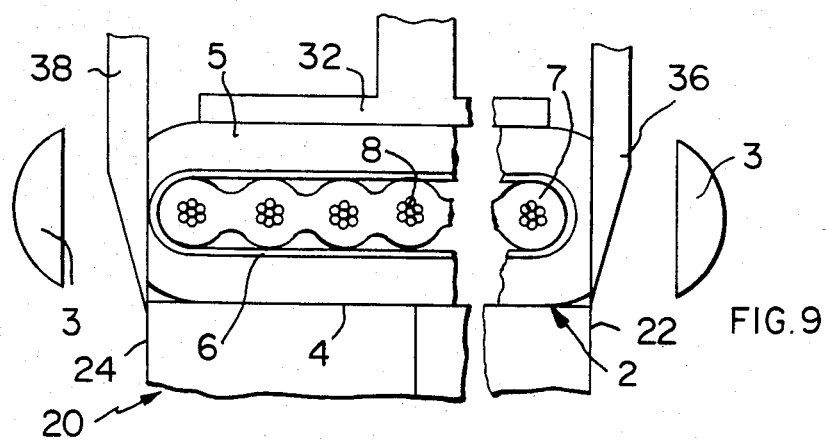
FIG. 9 is an end view of the cable shearing operation with nonuniform insulation thickness on opposed edges.

FIG. 9 shows the result of shearing the lateral edges 3 when the shielded inner cable is off-center due to wandering during extrusion of the outer jacket 5. The blades 36, 38 are carefully positioned by shimming so that where the insulation 5 on edge 3 is thinnest, the blade (in this case 38) will not nick the shield 6. On the opposed edge, however, the blade (in this case 38) does not pass sufficiently close to the shield 6 to tear the insulation 5 free from the shield.

Thus, while manufacturing tolerances do not permit consistently exposing the shield on both edges of the cable, the invention recognizes that exposure of one edge and considerably weakening the opposed edge sufficiently relieves stresses in the "slug" to permit stripping without damage to the shield.

Subsequent steps in preparation for termination would include slitting the shield along the edges, as by blades having means for limiting penetration, and rolling the shield and drain wires back against opposed planar sides, as by counter rotating brushes.

The foregoing is exemplary and not intended to limit the scope of the claims which follow.

I claim:

1. An apparatus for stipping a length of insulation from the end of a shielded ribbon cable, said apparatus comprising:
   positioning means for positively positioning the lateral edges of said cable proximate said end,
   shearing means for simultaneously shearing insulation from opposed lateral edges of the cable along said length at the end of the cable, said shear means moving transversely of the plane of the cable, said shear means exposing said shield on at least one edge of the cable proximate said end,
   first and second scoring blades for forming parallel cuts in the insulation on opposite planar sides of said cable, each cut being spaced said length from said end, said blades having parallel rectilinear edges which penetrate said insulation without cutting said shield.

2. Apparatus as in claim 1 further comprising resilient clamping means for positively positioning the planar sides of said cable proximate the end thereof, said clamping means comprising an anvil and an opposed relatively movable plate, said first scoring blade being fixed relative to said anvil.

3. Apparatus as in claim 2 wherein said plate is fixed resiliently to a ram which is reciprocably movable relative to said anvil, said second scoring blade being fixed relative to said ram, said plate being arranged to contact a planar side of said cable and move relatively toward said ram as said ram and said second scoring blade approach said cable.

4. Apparatus as in claim 2 wherein said plate is fixed resiliently to a ram which is reciprocably movable relative to said anvil, said shear means comprising a pair of parallel shear blades fixed relative to said ram said plate being arranged to contact a planar side of said cable and move relatively toward said ram as said ram and said shear blades approach said cable.

5. Apparatus as in claim 4 wherein said second scoring blade is fixed relative to said ram, said shear blades being arranged to shear said insulation on said opposed side edges as said second scoring blade approaches said cable.

6. Apparatus as in claim 2 wherein said positioning means comprises a pair of parallel sidewalls fixed relative to said anvil.

7. Apparatus as in claim 2 further comprising positive clamping means for gripping said cable remote from the end thereof, said positive clamping means being movable relative to said scoring blades, whereby said length of insulation may be removed by moving said clamping means while said blades remain penetrated in said cuts.

8. Apparatus as in claim 4 wherein said anvil has parallel side edges, each side edge being coplanar with a respective shear blade, said shear blades cooperating with said side edges to shear insulation from the lateral edges of the cable.

9. Apparatus as in claim 6 further comprising a stop fixed relative to said anvil, said stop limiting axial travel of a cable placed between said sidewalls.

10. A method of stripping a length of insulation from the end of a shielded ribbon cable, said method comprising the steps of:
    positively positioning the lateral edges of said cable proximate said end,
    simultaneously shearing the insulation from opposed lateral edges of the cable proximate the end thereof, said shearing exposing said shield on at least one edge of the cable proximate said end,
    forming cuts in the insulation by penetrating opposite planar sides of the cable with scoring blades, said cuts being spaced said length from said end, said blades penetrating said insulation without cutting said shield,
    pulling said cable to strip said length of insulation therefrom while said blades remain penetrated in said opposite planar sides.

11. The method of claim 10 comprising the additional step of resiliently clamping the opposed planar sides of said cable proximate the end thereof.

* * * * *